United States Patent
Zhang et al.

(10) Patent No.: US 11,570,772 B2
(45) Date of Patent: Jan. 31, 2023

(54) METHOD AND DEVICE FOR TRANSMITTING SYNCHRONIZATION SIGNAL

(71) Applicant: Guangdong OPPO Mobile Telecommunications Corp., Ltd., Guangdong (CN)

(72) Inventors: Zhi Zhang, Guangdong (CN); Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 43 days.

(21) Appl. No.: 16/492,602

(22) PCT Filed: Mar. 15, 2017

(86) PCT No.: PCT/CN2017/076849
§ 371 (c)(1),
(2) Date: Sep. 9, 2019

(87) PCT Pub. No.: WO2018/165926
PCT Pub. Date: Sep. 20, 2018

(65) Prior Publication Data
US 2020/0053727 A1    Feb. 13, 2020

(51) Int. Cl.
*H04W 72/04*    (2009.01)
*H04W 84/12*    (2009.01)

(52) U.S. Cl.
CPC ....... *H04W 72/0446* (2013.01); *H04W 84/12* (2013.01)

(58) Field of Classification Search
None
See application file for complete search history.

(56) References Cited

U.S. PATENT DOCUMENTS

| 6,738,443 B1 | 5/2004 | Bohnke et al. |
| 8,842,606 B2 | 9/2014 | Denteneer et al. |
| (Continued) | | |

FOREIGN PATENT DOCUMENTS

| CN | 103370897 A | 10/2013 |
| CN | 105049148 A | 11/2015 |
| (Continued) | | |

OTHER PUBLICATIONS

Spreadtrum Communications, "Indication of the SS-block index in multi-beam cases", Jan. 16-20, 2017, 3GPP Draft, R1-1700288, pp. 1-4.*

(Continued)

*Primary Examiner* — Adnan Baig
(74) *Attorney, Agent, or Firm* — Young Basile Hanlon & MacFarlane, P.C.

(57) ABSTRACT

A method and device for transmitting a synchronization signal are provided. The method includes: a terminal device receives time domain position indication information sent by a network device, wherein the time domain position indication information is used for indicating an offset of a position of a time domain resource of each SS block in M SS blocks relative to a predetermined position, and the M is a positive integer greater than or equal to 1; and the terminal device determines the time domain resource of each SS block according to the time domain position indication information.

12 Claims, 10 Drawing Sheets

100

A network device generates time domain position indication information, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1 ⟶ S110

The network device sends the time domain position indication information to a terminal device ⟶ S120

(56) References Cited

U.S. PATENT DOCUMENTS

| | | | |
|---|---|---|---|
| 2014/0314053 A1 | 10/2014 | Liu et al. | |
| 2015/0365975 A1 | 12/2015 | Sahlin et al. | |
| 2016/0094377 A1 | 3/2016 | Chen et al. | |
| 2019/0222288 A1* | 7/2019 | Zhou | H04L 27/2613 |
| 2019/0229961 A1* | 7/2019 | Gao | H04J 11/0076 |
| 2019/0387441 A1* | 12/2019 | Koskela | H04W 36/30 |

FOREIGN PATENT DOCUMENTS

| | | |
|---|---|---|
| CN | 105101098 A | 11/2015 |
| CN | 106464627 A | 2/2017 |
| EP | 3133881 A1 | 2/2017 |
| RU | 2540891 C2 | 2/2015 |
| RU | 2552178 C2 | 6/2015 |
| WO | 2015116940 A1 | 8/2015 |
| WO | 2016202386 A1 | 12/2016 |

OTHER PUBLICATIONS

English translation of Russia Grant for RU Application 2019131740/07(062380) dated Jul. 15, 2020.
English translation of Chile Office Action for CL Application 2019-002572 dated Sep. 16, 2020.
3GPPTSGRANWG1 Meeting #87; R1-1611969; Reno, Nevada, U.S.A., Nov. 14-18, 2016.
3GPP TSG-RAN WG1 NR adhoc; R1-1700292 Spokane, WA, USA, Jan. 16-20, 2017.
Extended Search Report for EP application No. 17900660.6 dated Feb. 12, 2020.
3GPP TSG RAN WG1 NR Ad-Hoc Meeting; Spokane, USA, Jan. 16-20, 2017; R1-1701037.
3GPP TSG RAN WG 1 AH_NR Meeting; Spokane, USA, Jan. 16-20, 2017; RI-1700288.
3GPP TSG RAN WG1 Meeting #88; Athens, Greece Feb. 13-17, 2017; R1-1703422.
NPL_WF on SS-block indication.
NPL_Design of SS burst set and SS block index.
NPL_ConsiderationsSSBurstDesignandIndication.
NPL_Discussion_SSBlockBustBurstSetMultiBeamCase.
Communication pursuant to Article 94(3) EPC Examination for EP Application 17900660.6 dated Sep. 23, 2020.
Canada Examiner Report for CA Application 3,055,628 dated Oct. 27, 2020.
Singapore Written Opinion for SG Application 11201908333W dated Nov. 10, 2020.
China First Office Action with English Translation for CN Application 201911319999.5 dated Nov. 3, 2020.
Korean Office Action for Application No. 10-2019-7026475 with English Translation dated Jan. 28, 2021.
Japanese Office Action for Application No. 2019-548886 with English Translation dated Jan. 20, 2017.
First Indian Examination Report for Application No. 201917037963 dated Jan. 13, 2021.
European Examination Report for Application No. 17900660.6 dated Mar. 15, 2021.
3GPP TSG RAN WG1 AH_NR Meeting; R1-1700329; Spokane, USA, Jan. 16-20, 2017 pp. 1-4.
3GPP TSG-RAN WG1 NR AdHoc; R1-1700793; Nov. 16-20, 2016; Spokane, WA, USA pp. 1-2.
3GPP TSG RAN WG1 #88; R1-1702901; Athens, Greece Feb. 13-17, 2017 pp. 2-6E.
3GPP TSG RAN WG1 Meeting #88; R1-1703353; Athens, Greece, Feb. 13-17, 2017 pp. 1-7.
Canadian Examination Report for CA Application 3055628 dated Jun. 22, 2021. (4 pages).
Chile Office Action with English Translation for CL Application 2019002572 dated Jun. 17, 2021. (46 pages).
Communication pursuant to Article 94(3) EPC for EP Application 17900660.6 dated Aug. 12, 2021. (7 pages).
Japanese Office Action with English Translation for JP Application 2019-548886 dated Jul. 20, 2021. (6 pages).
Korean Office Action with English Translation for KR Application 10-2019-7026475 dated Jul. 20, 2021. (9 pages).
Korean Office Action with English Translation for KR Application 1020197026475 dated Sep. 16, 2021. (9 pages).
Japanese Reconsideration Report by Examiner before Appeal with English Translation for JP Application 2021015695 dated Dec. 13, 2021. (5 pages).
Japanese Notice of Termination of Reconsideration by Examiners before Appeal Proceedings with English Translation tor JP Application 202115695 dated Dec. 21, 2021. (2 pages).
Israel Office Action with English Translation for IL Application 269193 dated Nov. 29, 2021. (5 pages).
Communication pursuant to Article 94(3) EPC for EP Application 17900660.6 dated Feb. 2, 2022. (8 pages).
Australian Examination Report for AU Application 2017403651 dated Dec. 16, 2021. (4 pages).
Singapore Invitation to Respond to Written Opinion for SG Application 11201908333W dated Feb. 23, 2022. (6 pages).
Chile Office Action with English Translation for CL Application 2019002572 dated Feb. 21, 2022. (4 pages).
Vietnam First Office Action with English Translation for VN Application 1201905289 dated Sep. 12, 2022. (3 pages).

* cited by examiner

100

A network device generates time domain position indication information, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1 — S110

The network device sends the time domain position indication information to a terminal device — S120

FIG. 1

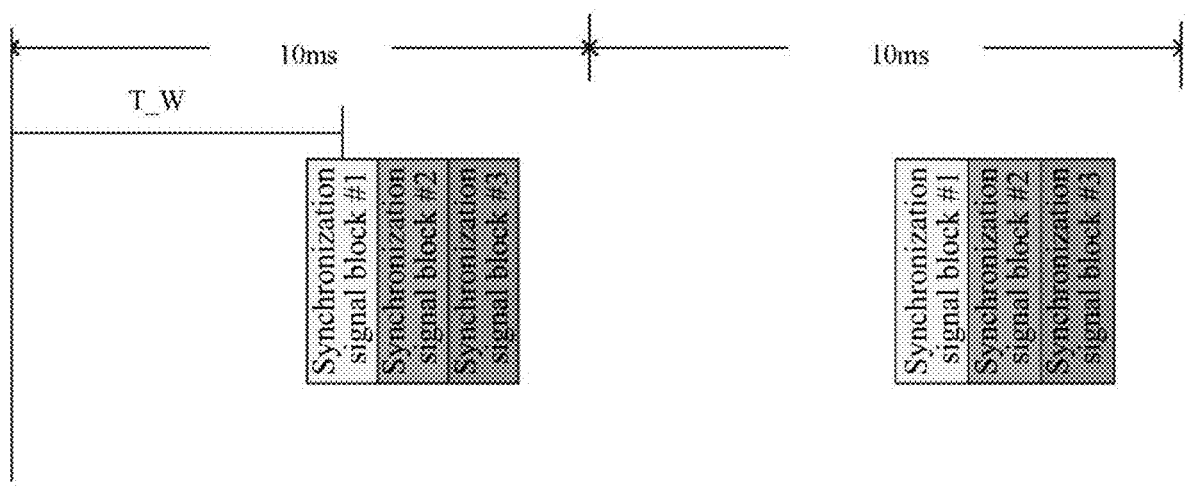

FIG. 2

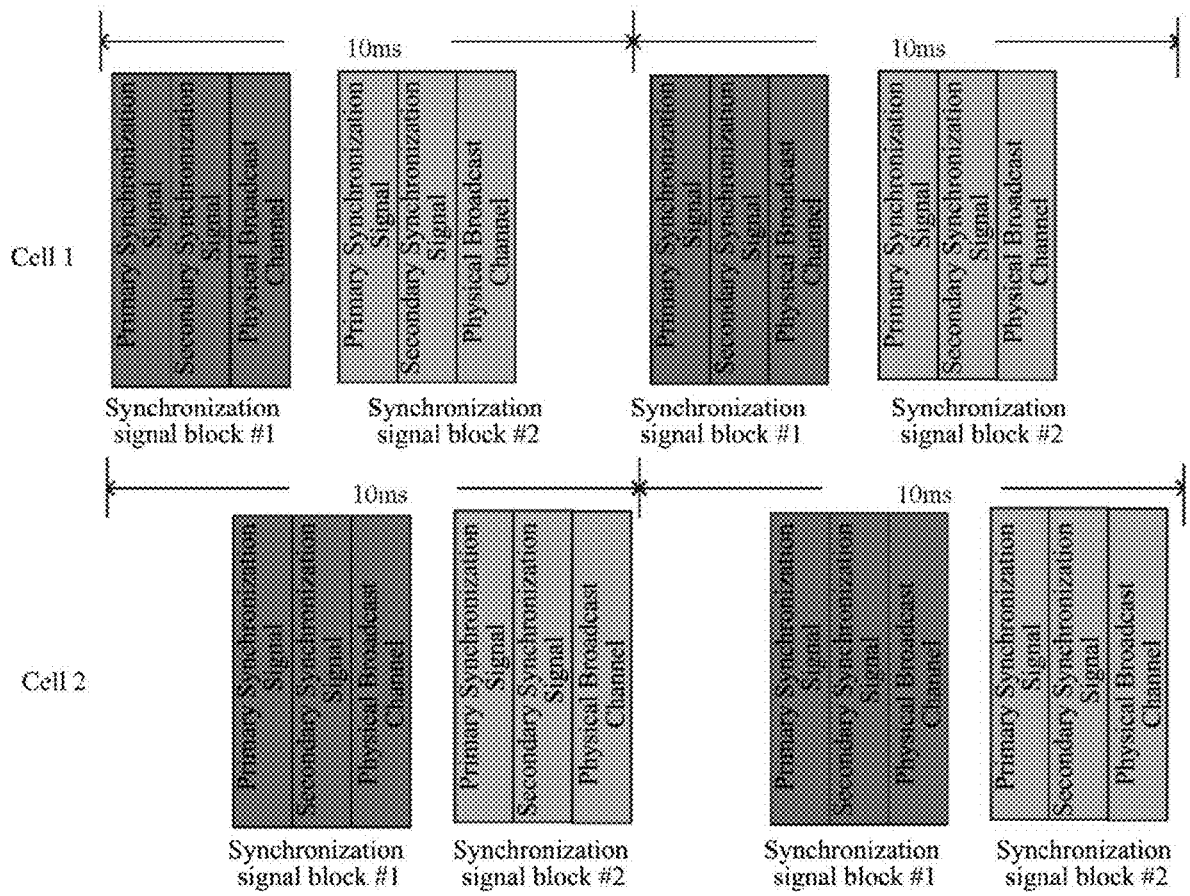

A network device generates time domain position indication information, wherein the time domain position indication information is used for indicating an offset of a position of a time domain resource of each synchronization signal (SS) block in M SS blocks relative to a predetermined position, and the M is a positive integer greater than or equal to 1 — S210

The network device sends the time domain position indication information to a terminal device — S220

FIG. 11

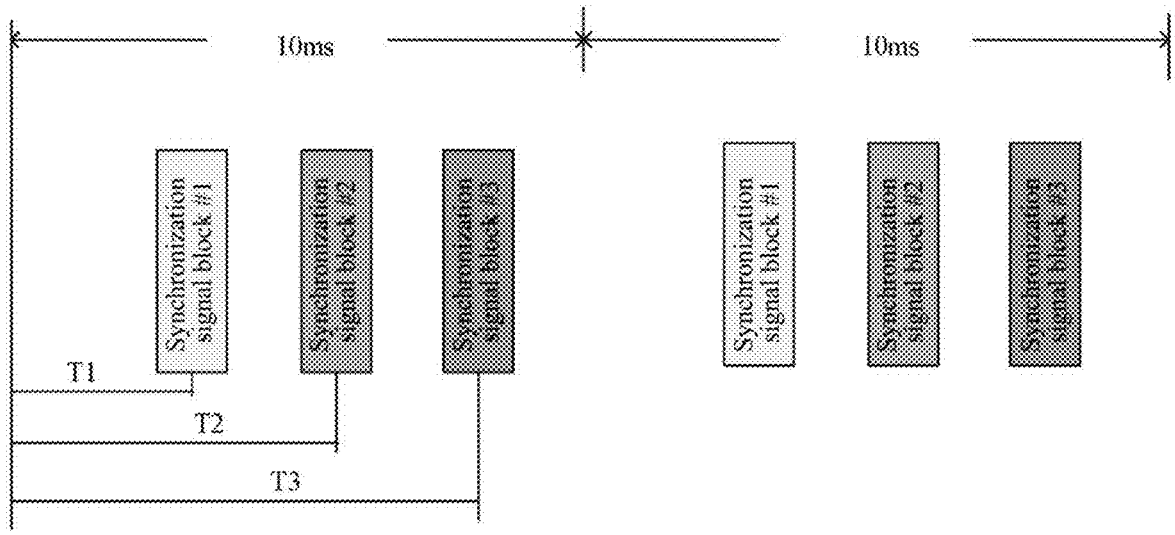

A terminal device receives time domain position indication information sent by a network device, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1 — S310

The terminal device determines a time domain resource of each first SS block according to the first time domain offset information — S320

A terminal device receives time domain position indication information sent by a network device, wherein the time domain position indication information is used for indicating an offset of a position of a time domain resource of each synchronization signal (SS) block in M SS blocks relative to a predetermined position, and the M is a positive integer greater than or equal to 1 ∽ S410

The terminal device determines a time domain resource of each SS block according to the time domain position indication information ∽ S420

FIG. 14

Network device 10

Processing module 11

Transceiving module 12

FIG. 15

METHOD AND DEVICE FOR TRANSMITTING SYNCHRONIZATION SIGNAL

CROSS-REFERENCE TO RELATED APPLICATION(S)

This application is a 371 application of International Application No. PCT/CN2017/076849, filed on Mar. 15, 2017, the entire disclosure of which is hereby incorporated by reference.

TECHNICAL FIELD

Implementations of the present disclosure relate to the field of communication, and more particularly, relate to a method and device for transmitting a synchronization signal.

BACKGROUND

Future communication systems (e.g., a 5th Generation (5G)) cover an entire cell with different beams, i.e., each beam covers a small area, and an effect of multiple beams covering the entire cell is realized by sweeping in time. Different Synchronization Signal (SS) blocks are transmitted on different beams, and User Equipment (UE) may distinguish different beams through different SS Blocks. And in a cell, there are multiple time domain resource positions corresponding to a SS Block that the UE needs to detect.

SUMMARY

The present disclosure provides a method and device for transmitting a synchronization signal.

In a first aspect, a method for transmitting a synchronization signal is provided. The method includes: a network device generates time domain position indication information, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1; and the network device sends the time domain position indication information to a terminal device.

In combination with the first aspect, in one implementation of the first aspect, the time domain position indication information further includes second time domain offset information for indicating an offset of a position of a time domain resource of each first SS block relative to the position of the time domain resources of the SS block group.

In combination with the first aspect and the above-described implementation thereof, in another implementation of the first aspect, the time domain position indication information further includes time domain resource indication information and first quantity information, the time domain resource indication information is used for indicating a target time domain resource including the time domain resources of the SS block group, and the first quantity information is used for indicating a value of the M.

In combination with the first aspect and the above-described implementations thereof, in another implementation of the first aspect, the time domain position indication information further includes time interval information and second quantity information, the time interval information is used for the terminal device to determine a time interval between positions of time domain resources of two adjacent first SS blocks in the M first SS blocks, and the second quantity information is used for indicating a value of the M.

In combination with the first aspect and the above-described implementations thereof, in another implementation of the first aspect, the time interval information is used for indicating a minimum time interval between the positions of the time domain resources of two adjacent first SS blocks.

In combination with the first aspect and the above-described implementations thereof, in another implementation of the first aspect, the M is a positive integer greater than or equal to 2, and the time interval information is used for indicating a time interval between an end position of a time domain resource of an $i^{th}$ first SS block and a beginning position of a time domain resource of an $(i+1)^{th}$ first SS block, i=1, ..., M−1; or the time interval information is used for indicating a time interval between a beginning position of the time domain resource of the $i^{th}$ first SS block and the beginning position of the time domain resource of the $(i+1)^{th}$ first SS block, i=1, ..., M−1.

In combination with the first aspect and the above-described implementations thereof, in another implementation of the first aspect, the M first SS blocks correspond to a first cell, and the method further includes: the network device determines a position of a time domain resource of each first SS block, wherein a position of a time domain resource(s) of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

In combination with the first aspect and the above-described implementations thereof, in another implementation of the first aspect, the position of the time domain resource of the each first SS block and a position of a time domain resource of each second SS block in the N second SS blocks have no overlap.

In combination with the first aspect and the above-described implementations thereof, in another implementation of the first aspect, the method further includes: the network device receives reference information for the network device to determine a position of a time domain resource of each second SS block; wherein determining, by the network device, the position of the time domain resource of the each first SS block, includes: the network device determines the position of the time domain resource of the each first SS block according to the reference information.

In a second aspect, a method for transmitting a synchronization signal is provided. The method includes: a network device generates time domain position indication information, wherein the time domain position indication information is used for indicating an offset of a position of a time domain resource of each synchronization signal (SS) block in M SS blocks relative to a predetermined position, and the M is a positive integer greater than or equal to 1;and the network device sends the time domain position indication information to a terminal device.

In a third aspect, a method for transmitting a synchronization signal is provided. The method includes: a terminal device receives time domain position indication information sent by a network device, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1; and the terminal device determines a time domain resource of each first SS block according to the first time domain offset information.

In combination with the third aspect, in one implementation of the third aspect, the time domain position indication information further includes second time domain offset information for indicating an offset of a position of a time domain resource of each first SS block relative to the position of the time domain resources of the SS block group.

Herein, determining, by the terminal device, the time domain resource of the each first SS block according to the first time domain offset information, includes: the terminal device determines the time domain resource of the each first SS block according to the first time domain offset information and the second time domain offset information.

In combination with the third aspect and the above-described implementations thereof, in another implementation of the third aspect, the time domain position indication information further includes time domain resource indication information and first quantity information, the time domain resource indication information is used for indicating a target time domain resource including the time domain resources of the SS block group, and the first quantity information is used for indicating a value of the M.

Herein, determining, by the terminal device, the time domain resource of the each first SS block according to the first time domain offset information, includes: the terminal device determines the time domain resource of the each first SS block according to the first time domain offset information, the time domain resource indication information, and the first quantity information.

In combination with the third aspect and the above-described implementations thereof, in another implementation of the third aspect, the time domain position indication information further includes time interval information and second quantity information, the time interval information is used for the terminal device to determine a time interval between positions of time domain resources of two adjacent first SS blocks in the M first SS blocks, and the second quantity information is used for indicating a value of the M.

Herein, determining, by the terminal device, the time domain resource of the each first SS block according to the first time domain offset information, includes: the terminal device determines the time domain resource of the each first SS block according to the first time domain offset information, the time interval information, and the second quantity information.

In combination with the third aspect and the above-described implementations thereof, in another implementation of the third aspect, the time interval information is used for indicating a minimum time interval between the positions of the time domain resources of two adjacent first SS blocks.

In combination with the third aspect and the above-described implementations thereof, in another implementation of the third aspect, the M is a positive integer greater than or equal to 2, and the time interval information is used for indicating a time interval between an end position of a time domain resource of an $i^{th}$ first SS block and a beginning position of a time domain resource of an $(i+1)^{th}$ first SS block, i=1, ..., M−1; or the time interval information is used for indicating a time interval between a beginning position of the time domain resource of the $i^{th}$ first SS block and the beginning position of the time domain resource of the $(i+1)^{th}$ first SS block, i=1, ... M−1.

In combination with the third aspect and the above-described implementations thereof, in another implementation of the third aspect, the M first SS blocks correspond to a first cell, and a position of a time domain resource(s) of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

In combination with the third aspect and the above-described implementations thereof, in another implementation of the third aspect, the position of the time domain resource of the each first SS block and a position of a time domain resource of each second SS block in the N second SS blocks have no overlap.

In a fourth aspect, a method for transmitting a synchronization signal is provided. The method includes: a terminal device receives time domain position indication information sent by a network device, wherein the time domain position indication information is used for indicating an offset of a position of a time domain resource of each SS block in M SS blocks relative to a predetermined position, and the M is a positive integer greater than or equal to 1; and the terminal device determines the time domain resource of each SS block according to the time domain position indication information.

In a fifth aspect, a network device is provided. The network device is used for implementing the method in the first aspect or any possible implementation of the first aspect. Specifically, the network device includes function modules for implementing the method in the first aspect or any possible implementation of the first aspect.

In a sixth aspect, a network device is provided for implementing the method of the second aspect. Specifically, the network device includes function modules for implementing the method in the second aspect.

In a seventh aspect, a terminal device is provided for implementing the method in the third aspect or any possible implementation of the third aspect. Specifically, the terminal device includes function modules used for implementing the method in the third aspect or any possible implementation of the third aspect.

In an eighth aspect, a terminal device is provided for implementing the method of the fourth aspect. Specifically, the terminal device includes function modules for implementing the method in the fourth aspect.

In a ninth aspect, a network device is provided. The network device includes a processor, a memory, and a transceiver. The processor, the memory, and the transceiver communicate with each other through internal connection paths to transfer control and/or data signals, causing the network device to perform the method in the first aspect or any possible implementation of the first aspect.

In a tenth aspect, a network device is provided. The network device includes a processor, a memory, and a transceiver. The processor, the memory, and the transceiver communicate with each other through internal connection paths to transfer control and/or data signals, causing the network device to perform the method in the second aspect.

In an eleventh aspect, a terminal device is provided. The terminal device includes a processor, a memory, and a transceiver. The processor, the memory, and the transceiver communicate with each other through internal connection paths to transfer control and/or data signals, causing the terminal device to perform the method in the third aspect or any possible implementation of the third aspect.

In a twelfth aspect, a terminal device is provided. The terminal device includes a processor, a memory, and a transceiver. The processor, the memory, and the transceiver communicate with each other through internal connection paths to transfer control and/or data signals, causing the terminal device to perform the method in the fourth aspect.

In a thirteenth aspect, a computer readable medium is provided for storing a computer program. The computer program includes instructions used for executing the first aspect or any possible implementation of the first aspect.

In a fourteenth aspect, a computer readable medium is provided for storing a computer program. The computer program includes instructions used for executing the second aspect or any possible implementation of the second aspect.

In a fifteenth aspect, a computer readable medium is provided for storing a computer program. The computer program includes instructions used for executing the third aspect or any possible implementation of the third aspect.

In a sixteenth aspect, a computer readable medium is provided for storing a computer program. The computer program includes instructions used for executing the fourth aspect or any possible implementation of the fourth aspect.

BRIEF DESCRIPTION OF DRAWINGS

FIG. 1 is a schematic flowchart of a method for transmitting a synchronization signal according to an implementation of the present disclosure.

FIG. 2 is a schematic diagram of a method for transmitting a synchronization signal according to an implementation of the present disclosure.

FIG. 10 is yet another schematic diagram of a method for transmitting a synchronization signal according to an implementation of the present disclosure.

FIG. 11 is a schematic flowchart of a method for transmitting a synchronization signal according to another implementation of the present disclosure.

FIG. 12 is a schematic diagram of a method for transmitting a synchronization signal according to another implementation of the present disclosure.

FIG. 13 is a schematic flowchart of a method for transmitting a synchronization signal according to yet another implementation of the present disclosure.

FIG. 14 is a schematic flowchart of a method for transmitting a synchronization signal according to yet another implementation of the present disclosure.

FIG. 15 is a schematic block diagram of a network device according to an implementation of the present disclosure.

DETAILED DESCRIPTION

Figure 3:
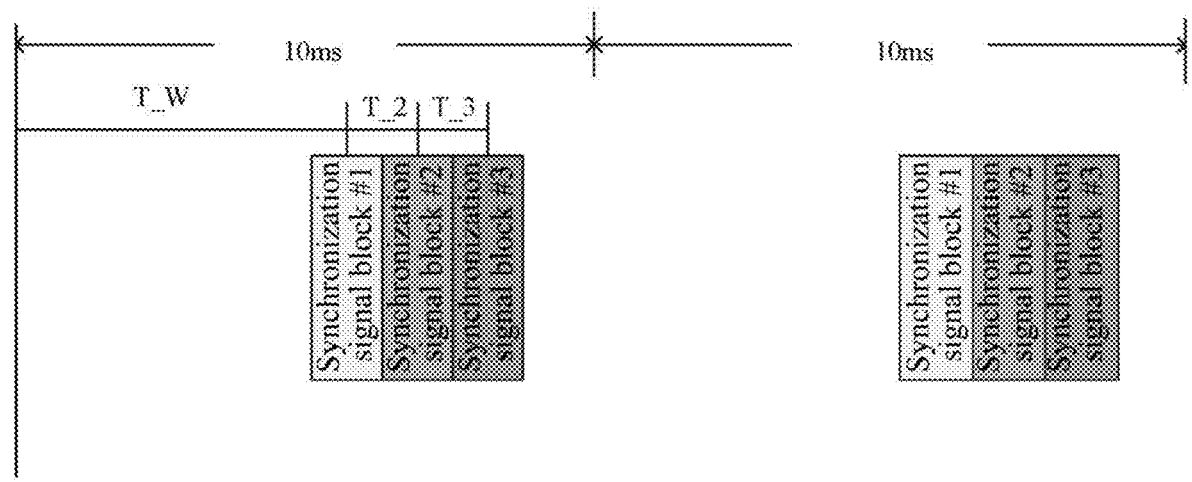
FIG. 3 is another schematic diagram of a method for transmitting a synchronization signal according to an implementation of the present disclosure.

Technical solutions in implementations of the present disclosure will be clearly and completely described below with reference to the drawings in the implementations of the present disclosure.

It should be understood that the technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) or a Worldwide Interoperability for Microwave Access (WiMAX) communication system, a Fifth-Generation (5G) system, or a New Radio (NR) system, etc.

In the implementations of the present disclosure, a terminal device may include, but is not limited to, a Mobile Station (MS), a Mobile Terminal, a Mobile Telephone, a User Equipment (UE), a handset, a portable equipment, a vehicle, and so on. The terminal device may communicate with one or more core networks via a radio access network (RAN). For example, the terminal device may be a mobile phone (or referred to as "cellular" phone) or a computer with wireless communication functions. The terminal device may be a mobile device that is portable, pocket-sized, hand-held, built in a computer, or mounted on a vehicle.

In the implementations of the present disclosure, a network device is a device deployed in a wireless access network to provide wireless communication functions for a terminal device. The network device may be a base station, which may include various forms of Macro base stations, micro base stations, relay stations, access points, etc. In systems using different wireless access technologies, names of devices with base station functions may be different. For example, in a LTE network, it is called an Evolved NodeB (eNB or eNodeB), and in a 3rd Generation (3G) network, it is called Node B.

FIG. 1 shows a method for transmitting a synchronization signal according to an implementation of the present disclosure. As shown in FIG. 1, the method 100 includes the following acts S110-S120.

In S110, a network device generates time domain position indication information, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1.

In S120, the network device sends the time domain position indication information to a terminal device.

The method for transmitting a synchronization signal of the present disclosure enables a terminal device to accurately know a time domain resource for detecting a synchronization signal.

According to the method for transmitting the synchronization signal in the present disclosure, the time domain position indication information sent by the network device to the terminal device includes first time domain offset information, and the terminal device can accurately determine a time domain resource of a synchronization signal (SS) Block according to the first time domain offset information, and that the network device sends the time domain position indication information to the terminal device enables the network device to flexibly configure the time domain resource for transmitting the synchronization signal.

In an implementation of the present disclosure, one SS Block may include a Primary Synchronization Signal (PSS), a Secondary Synchronization Signal (SSS), or may further include a Physical Broadcast Channel (PBCH), or may further include time information related to the SS Block. In addition, the PSS and the SSS in one SS Block are separated in a time domain, and the PBCH is separated from the PSS and the SSS in the time domain.

It should be noted that in a process of describing specific implementations, an offset indicated by a piece of information may be a value of an offset directly indicated by the piece of information, or an identification of a certain offset in a set of predetermined offsets directly indicated by the piece of information, and the terminal device may determine a specific value of the offset according to the identification.

Optionally, when the time domain position indication information includes the first time domain offset information in the S110, the terminal device, after receiving the time domain position indication information, specifically determines a position of a time domain resource of each first SS Block according to the first time domain offset information and a way specified by a protocol and/or other configurations of a system. Here, the position of the time domain resources of the SS block group may be a beginning position of a time domain resource of one first SS block with the most front time domain position among the M first SS blocks, or an end position of a time domain resource of one first SS block with the most rear time domain position among the M first SS blocks. Optionally, the position of the time domain resource of the SS block group may be a beginning position or an end position of a time domain resource of any one first SS block in the M first SS blocks. The present disclosure is not limited thereto.

For example, as shown in FIG. 2, the network device and the terminal device may pre-agree that positions of time domain resources of SS Block #1, SS Block #2, and SS Block #3 are adjacent immediately, and the position of the time domain resources of the SS Block group composed of these three SS Blocks refers to a middle position of the time domain resource of SS Block #1. In FIG. 2, T_W represents an offset of the three SS Blocks as a whole relative to a predetermined position. The terminal device may determine a time domain resource of each SS block in the three SS blocks according to T_W and other information (specification of the protocol and/or other system configurations). Other information here may be, for example, a size of the time domain resource of each SS Block, a period of scheduling a resource (e.g., 10 ms in FIG. 2).

Optionally, in the S110, the time domain position indication information further includes second time domain offset information for indicating an offset of a position of a time domain resource of each first SS block relative to the position of the time domain resources of the SS block group.

For example, as shown in FIG. 3, T_W represents an offset of the three SS Blocks as a whole relative to the predetermined position, T_2 and T_3 represent the offsets of the time domain resources of SS Block #2 and SS Block #3 relative to T_W, respectively, and the terminal device may determine the positions of the time domain resources of SS Block #1, SS Block #2, and SS Block #3 according to T_W, T_2, and T_3. If the protocol specifies the size of the SS Block or the network device notifies the terminal device of the size of the SS Block through other configuration information, the terminal device may further determine the time domain resources of SS Block #1, SS Block #2 and SS Block #3.

Optionally, in the S110, the time domain position indication information further includes time domain resource indication information and first quantity information, the time domain resource indication information is used for indicating a target time domain resource including the time domain resources of the SS block group, and the first quantity information is used for indicating a value of the M.

It should be noted that the target time domain resource may only include the time domain resources of the SS block group, or may include the time domain resources of the SS block group and other time domain resources around the SS block group, and the specific definition depends on the specification of the protocol.

Figure 4:
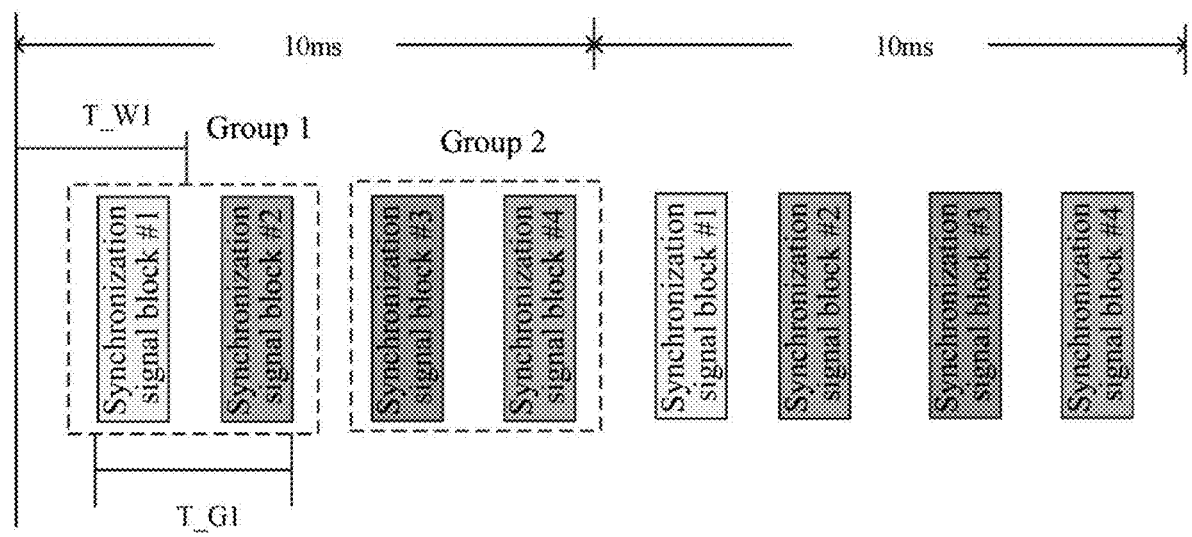
FIG. 4 is yet another schematic diagram of a method for transmitting a synchronization signal according to an implementation of the present disclosure.

For example, as shown in FIG. 4, T_W1 represents an offset of SS Block #1 and SS Block #2 as a whole relative to a predetermined position, and T_G1 represents time domain resources including SS Block #1 and SS Block #2. After receiving the time domain position indication information sent by the network device, the terminal device may determine time domain positions of SS Block #1 and SS Block #2 according to T_W1, T_G1 and the first quantity information. If the protocol specifies the size of the SS Block or the network device notifies the terminal device of the size of the SS Block through other configuration information, the terminal device may further determine the time domain resources of SS Block #1 and SS Block #2.

Optionally, in the 5110, the time domain position indication information further includes time interval information and second quantity information, the time interval information is used for the terminal device to determine a time interval between positions of time domain resources of two adjacent first SS blocks in the M first SS blocks, and the second quantity information is used for indicating a value of the M.

Specifically, in some implementations, the time interval information is used for indicating a minimum time interval between the positions of the time domain resources of two adjacent first SS blocks. Optionally, when M is a positive integer greater than or equal to 2, the time interval information is used for indicating a time interval between an end position of a time domain resource of an $i^{th}$ first SS block and a beginning position of a time domain resource of an $(i+1)^{th}$ first SS block, i=1, ..., M−1. Or, the time interval information is used for indicating a time interval between a beginning position of the time domain resource of the $i^{th}$ first SS block and the beginning position of the time domain resource of the $(i+1)^{th}$ first SS block, i=1, ..., M−1.

Figure 5:
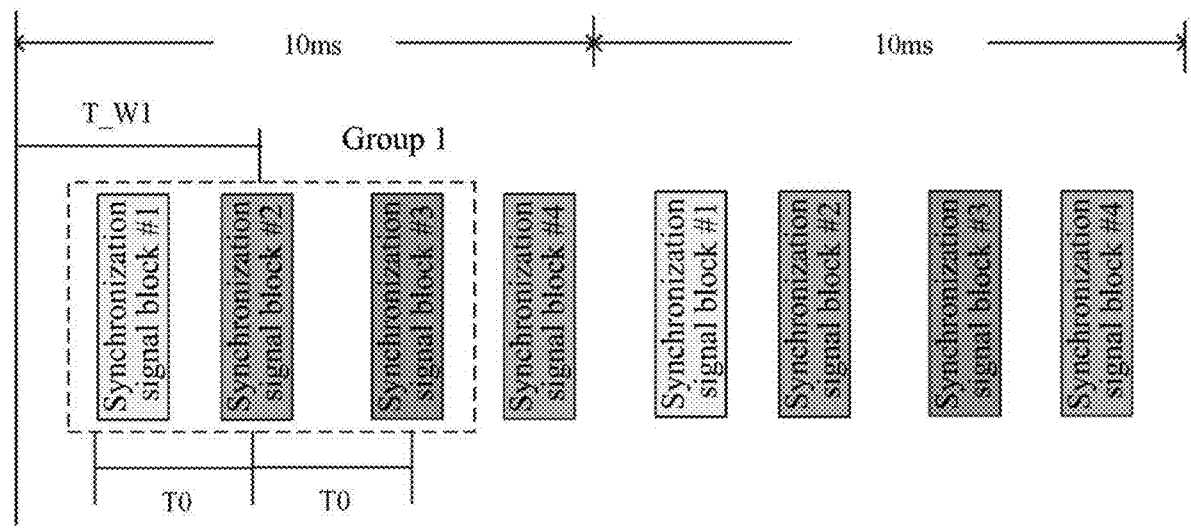
FIG. 5 is yet another schematic diagram of a method for transmitting a synchronization signal according to an implementation of the present disclosure.

For example, as shown in FIG. 5, T_W1 represents an offset of SS Block #1, SS Block #2, and SS Block #3 as a whole relative to a predetermined position. If the time intervals between positions of time domain resources of adjacent SS Blocks are equal and are all T0, the terminal device may determine the positions of time domain resources of SS Block #1, SS Block #2, and SS Block #3 according to T_W1 and T0 after receiving the time domain position indication information. If the protocol specifies the size of the SS Block or the network device notifies the terminal device of the size of the SS Block through other configuration information, the terminal device may further determine the time domain resources of SS Block #1, SS Block #2 and SS Block #3.

It should be noted that when the terminal device determines a position of a time domain resource of each SS Block according to the time domain position indication information, if the terminal device encounters a time domain resource which has an additional use and cannot be used for transmitting SS Blocks according to the specification of the protocol, the terminal device needs to determine the position of the time domain resource of each SS Block according to the time domain position indication information and these time domain resources which cannot be used for transmitting the SS Blocks.

For example, still taking FIG. 5 as an example, the time interval information indicates that a time interval between positions of the time domain resources of two adjacent SS Blocks is 3 Orthogonal Frequency Division Multiplexing (OFDM) symbols, and the terminal device determines that the time domain resource of SS Block #2 is on OFDM symbols numbered #1, #2 and #3 (the numbers of OFDM symbols in one subframe start from #0), and an OFDM symbol numbered #7 cannot be used for transmitting the SS Blocks, then the terminal device determines that a beginning position of a time domain resource of SS Block #3 is an OFDM symbol numbered #8. Thus, a time interval finally determined by the terminal device between the beginning position of the time domain resource of SS Block #3 and a beginning position of a time domain resource of SS Block #2 is actually 4 OFDM symbols.

In all the above implementations, optionally, the M first SS blocks correspond to a first cell, and when the network device determines a position of a time domain resource of each first SS block, it makes the position of the time domain resource(s) of at least one first SS block have no overlap or incomplete overlap with a position of a time domain resource of any second SS block in N second SS blocks. Here, the N second SS blocks correspond to a second cell, and the second cell is a neighbor cell of the first cell, and N is a positive integer greater than or equal to 1.

In other words, the time domain resources in the first cell determined by the network device to be used for transmitting the SS blocks have incomplete overlap or no overlap at all with the time domain resources in the second cell used for transmitting the SS blocks, thus interference of synchronization signals in two adjacent cells may be avoided, and the performance of the terminal device for detecting the synchronization signals is improved.

Optionally, if cell Identifications (IDs) of the first cell and the second cell are different, the network device may determine the position of the time domain resource of the each first SS block according to an ID of the first cell.

Further, the position of the time domain resource of the each first SS block and a position of a time domain resource of each second SS block in the N second SS blocks have no overlap. That is, the time domain resources used for transmitting SS blocks in the first cell and the time domain resources used for transmitting SS blocks in the second cell have no overlap at all.

Figure 6:
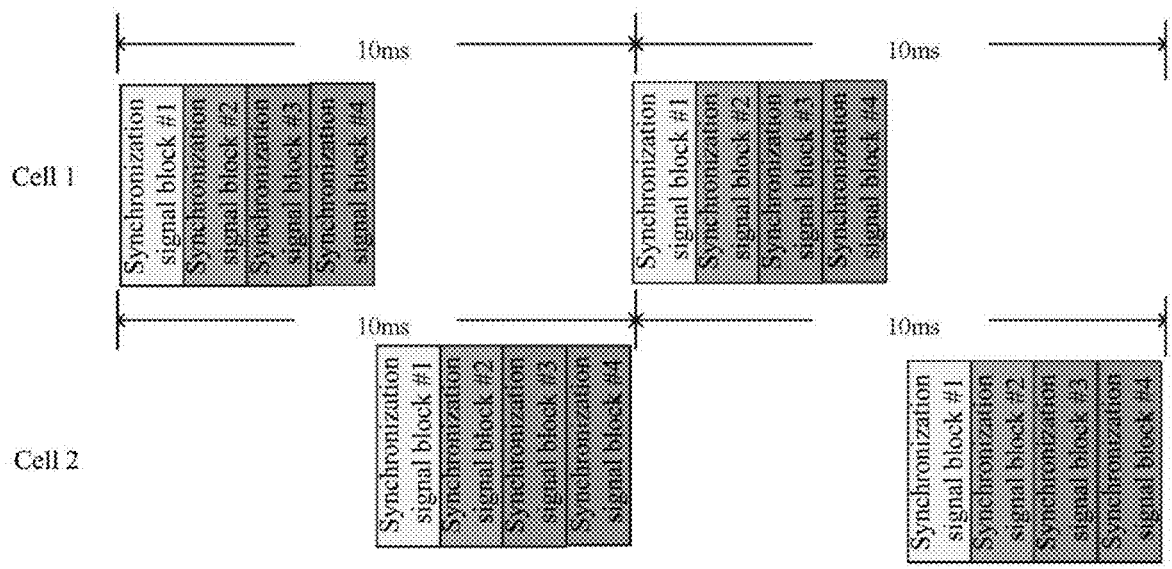
FIG. 6 is yet another schematic diagram of a method for transmitting a synchronization signal according to an implementation of the present disclosure.
Figure 7:
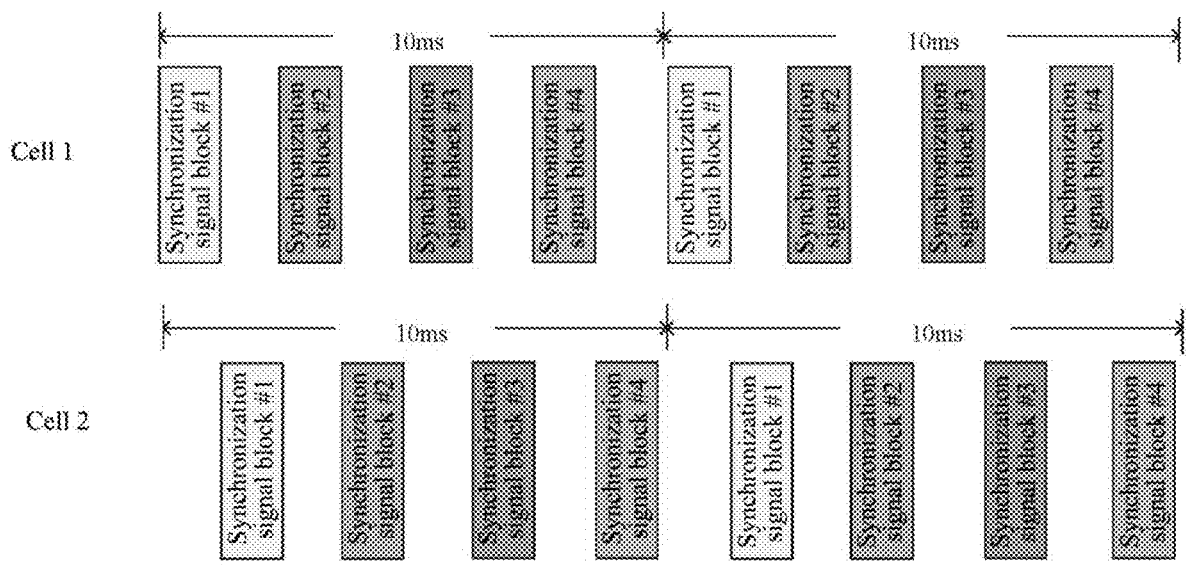
FIG. 7 is yet another schematic diagram of a method for transmitting a synchronization signal according to an implementation of the present disclosure.

For example, as shown in FIGS. 6 and 7, assuming that both of two cells have four SS blocks to be transmitted, the SS blocks of the two cells are completely staggered in the time domain, thus signals such as synchronization signals and PBCH may be staggered, and the performance of the terminal device for detecting the synchronization signals and PBCH signals is improved.

Figure 8:
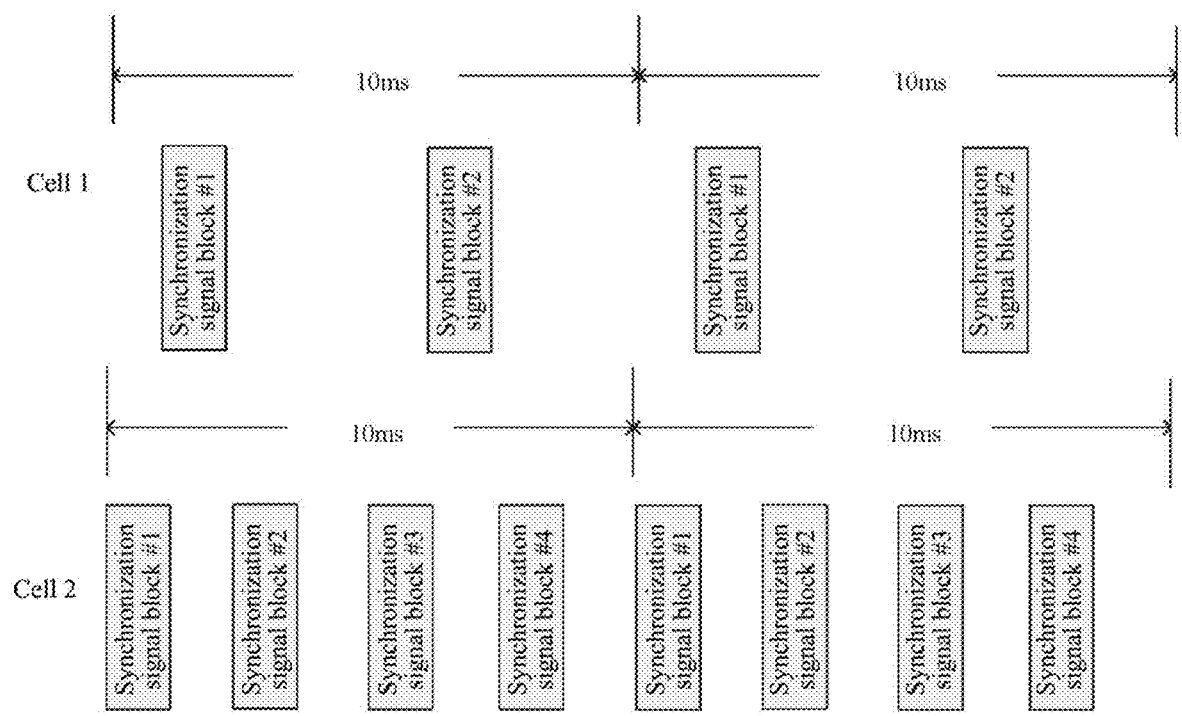
FIG. 8 is yet another schematic diagram of a method for transmitting a synchronization signal according to an implementation of the present disclosure.

Or, as shown in FIG. 8, assuming one cell has two SS blocks to be transmitted and another cell has four SS blocks to be transmitted, the SS blocks of the two cells are completely staggered in the time domain.

Figure 9:
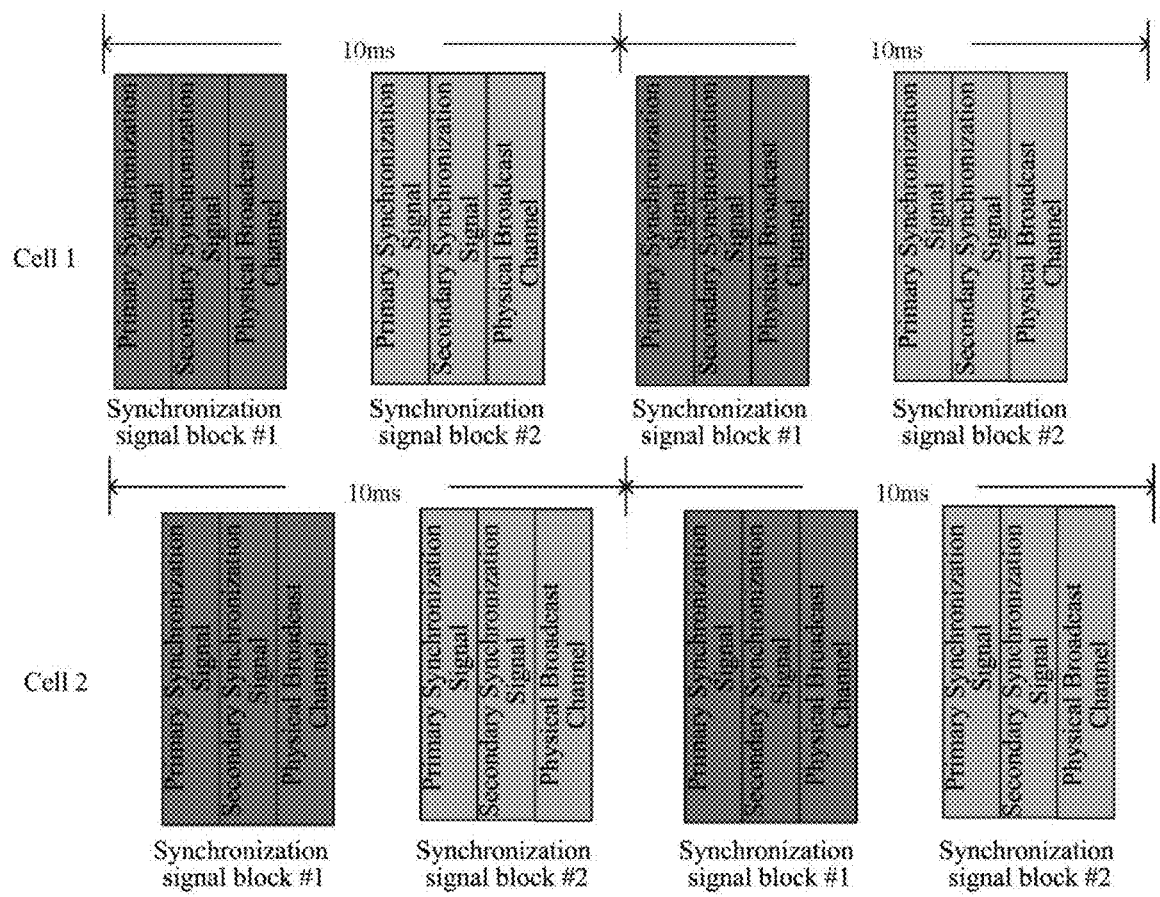
FIG. 9 is yet another schematic diagram of a method for transmitting a synchronization signal according to an implementation of the present disclosure.

Or, assuming that both of two cells have two SS blocks to be transmitted, it is not necessary for SS blocks of different cells to be completely staggered in the time domain, only part signals are staggered in the time domain. As shown in FIG. 9, only the PSS is staggered in the time domain to improve the performance of terminal device for detecting the PSS signal. Or, as shown in FIG. 10, the PSS and the SSS are staggered in the time domain to improve the performance of the terminal device for detecting the synchronization signals.

It should be noted that in the above-mentioned implementations, the PSS or the SSS may not occupy an entire OFDM symbol. In this case, the OFDM symbol may be divided into several sub-symbols, and the PSS or the SSS only occupies part of the sub-symbols.

Optionally, in some specific implementations, the network device may determine a beam that may generate interference in the first cell and the second cell. When determining a position of a time domain resource of a SS Block, a SS Block may be sent by the beam that may generate the interference through different time domain resources, while other beams that do not generate interference may send a SS Block on the same time domain resource.

In an implementation of the present disclosure, optionally, the first cell and the second cell may be cells belonging to the same network device, or the first cell and the second cell may be cells belonging to different network devices. For example, the first cell belongs to a first network device and the second cell belongs to a second network device. In this case, when determining the position of the time domain resource of each first SS block, the first network device may receive reference information and determine the position of the time domain resource of the each first SS block according to the reference information. The reference information here may be information directly indicating the position of the time domain resource of the each second SS block, or information indirectly indicating the position of the time domain resource of the each second SS block.

Moreover, a first network device directly receives reference information sent by a second network device through an interface between the first network device and the second network device. Or, the first network device receives the reference information sent by other devices in the system, and the implementations of the present disclosure are not limited thereto.

FIG. 11 shows a method for transmitting a synchronization signal according to another implementation of the present disclosure. As shown in FIG. 11, the method 200 includes the following acts S210-S220.

In S210, a network device generates time domain position indication information, wherein the time domain position indication information is used for indicating an offset of a position of a time domain resource of each synchronization signal (SS) block in M SS blocks relative to a predetermined position, and the M is a positive integer greater than or equal to 1.

In S220, the network device sends the time domain position indication information to a terminal device.

According to the method for transmitting the synchronization signal in the implementation of the present disclosure, the network device indicates the offset of the position of the time domain resource of each SS block relative to the predetermined position through the time domain position indication information, so that the terminal device can accurately determine the position of the time domain resource of the each SS block, and that the network device sends the time domain position indication information to the terminal device enables the network device to flexibly configure the time domain resource for transmitting the synchronization signal.

For example, as shown in FIG. 12, T1 represents an offset of a position of a time domain resource of SS Block #1 relative to a predetermined position, T2 represents the offset of the position of the time domain resource of SS Block #2 relative to the predetermined position, and T3 represents the offset of the position of the time domain resource of SS Block #3 relative to the predetermined position. After receiving the time domain position indication information, the terminal device determines positions of time domain resources of SS Block #1, SS Block #2, and SS Block #3 according to T1, T2, and T3.

The method for transmitting the synchronization signal according to the implementations of the present disclosure is described in detail at a network device side in conjunction with FIGS. 1 to 12 above, and the method for transmitting the synchronization signal according to the implementation of the present disclosure will be described in detail at a terminal device side in conjunction with FIGS. 13 and 14 below. It should be understood that an interaction between the terminal device and the network device described at the terminal device side is the same as that described at the network device side, and relevant descriptions are omitted appropriately to avoid repetition.

FIG. 13 shows a method for transmitting a synchronization signal according to another implementation of the present disclosure. As shown in FIG. 13, the method 300 includes the following acts S310-S320.

In S310, a terminal device receives time domain position indication information sent by a network device, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1.

In S320, the terminal device determines a time domain resource of each first SS block according to the first time domain offset information.

According to the method for transmitting the synchronization signal in the present disclosure, the time domain position indication information received by the terminal device and sent by the network device includes the first time domain offset information, and the terminal device can accurately determine a time domain resource of a synchronization signal (SS) Block according to the first time domain offset information, and that the network device sends the time domain position indication information to the terminal device enables the network device to flexibly configure the time domain resource for transmitting the synchronization signal.

In an implementation of the present disclosure, optionally, the time domain position indication information further includes second time domain offset information for indicating an offset of a position of a time domain resource of each first SS block relative to the position of the time domain resources of the SS block group.

Herein, the act S320 is specifically that the terminal device determines the time domain resource of the each first SS block according to the first time domain offset information and the second time domain offset information.

In an implementation of the present disclosure, optionally, the time domain position indication information further includes time domain resource indication information and first quantity information, the time domain resource indication information is used for indicating a target time domain resource including the time domain resources of the SS block group, and the first quantity information is used for indicating a value of the M.

Herein, the act S320 is specifically that the terminal device determines the time domain resource of the each first SS block according to the first time domain offset information, the time domain resource indication information, and the first quantity information.

In an implementation of the present disclosure, optionally, the time domain position indication information further includes time interval information and second quantity information, the time interval information is used for the terminal device to determine a time interval between positions of time domain resources of two adjacent first SS blocks in the M first SS blocks, and the second quantity information is used for indicating a value of the M.

Herein, the act S320 is specifically that the terminal device determines the time domain resource of the each first SS block according to the first time domain offset information, the time interval information, and the second quantity information.

In an implementation of the present disclosure, optionally, the time interval information is used for indicating a minimum time interval between the positions of the time domain resources of two adjacent first SS blocks.

In an implementation of the present disclosure, optionally, the M is a positive integer greater than or equal to 2, and the time interval information is used for indicating a time interval between an end position of a time domain resource of an $i^{th}$ first SS block and a beginning position of a time domain resource of an $(i+1)^{th}$ first SS block, i=1, ..., M−1; or, the time interval information is used for indicating a time interval between a beginning position of the time domain resource of the $i^{th}$ first SS block and the beginning position of the time domain resource of the $(i+1)^{th}$ first SS block, i=1, ..., M−1.

In an implementation of the present disclosure, optionally, the M first SS blocks correspond to a first cell, and a position of a time domain resource(s) of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

In an implementation of the present disclosure, optionally, the position of the time domain resource of the each first SS block and a position of a time domain resource of each second SS block in the N second SS blocks have no overlap.

FIG. 14 shows a method for transmitting a synchronization signal according to yet another implementation of the present disclosure. As shown in FIG. 14, the method 400 includes the following acts S410-S420.

In S410, a terminal device receives time domain position indication information sent by a network device, wherein the time domain position indication information is used for indicating an offset of a position of a time domain resource of each synchronization signal (SS) block in M SS blocks relative to a predetermined position, and the M is a positive integer greater than or equal to 1.

In S420, the terminal device determines a time domain resource of each SS block according to the time domain position indication information.

According to the method for transmitting the synchronization signal in the implementation of the application, the terminal device receives the time domain position indication information sent by the network device, wherein the time domain indication information indicates the offset of the position of the time domain resource of each SS block relative to the predetermined position, the terminal device can accurately determine the position of the time domain resource of the each SS block according to the time domain position indication information, and that the network device sends the time domain position indication information to the terminal device enables the network device to flexibly configure the time domain resource for transmitting the synchronization signal.

The method for transmitting the synchronization signal according to the implementations of the present disclosure has been described in detail above with reference to FIGS. 1 to 14. A network device according to an implementation of the present disclosure will be described in detail below with reference to FIG. 15. As shown in FIG. 15, the network device 10 includes a processing module 11 and a transceiving module 12.

The processing module 11 is used for generating time domain position indication information, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1.

The transceiving module 12 is used for sending the time domain position indication information to a terminal device.

The time domain position indication information sent to the terminal device by the network device according to the implementation of the present disclosure includes the first time domain offset information, so that the terminal device can accurately determine the time domain resource of the synchronization signal block according to the first time domain offset information, and the network device can flexibly configure the time domain resource for transmitting the synchronization signal as the network device sends the time domain position indication information to the terminal device.

In the implementation of the present disclosure, optionally, the time domain position indication information further includes second time domain offset information for indicating an offset of a position of a time domain resource of each first SS block relative to the position of the time domain resources of the SS block group.

In the implementation of the present disclosure, optionally, the time domain position indication information further includes time domain resource indication information and first quantity information, the time domain resource indication information is used for indicating a target time domain resource including the time domain resources of the SS block group, and the first quantity information is used for indicating a value of the M.

In the implementation of the present disclosure, optionally, the time domain position indication information further includes time interval information and second quantity information, the time interval information is used for the terminal device to determine a time interval between positions of time domain resources of two adjacent first SS blocks in the M first SS blocks, and the second quantity information is used for indicating a value of the M.

In the implementation of the present disclosure, optionally, the time interval information is used for indicating a minimum time interval between the positions of the time domain resources of two adjacent first SS blocks.

In the implementation of the present disclosure, optionally, the M is a positive integer greater than or equal to 2, and the time interval information is used for indicating a time interval between an end position of a time domain resource of an $i^{th}$ first SS block and a beginning position of a time domain resource of an $(i+1)^{th}$ first SS block, $i=1, \ldots, M-1$.

Optionally, the time interval information is used for indicating a time interval between a beginning position of the time domain resource of the $i^{th}$ first SS block and the beginning position of the time domain resource of the $(i+1)^{th}$ first SS block, $i=1, \ldots, M-1$.

In the implementation of the present disclosure, optionally, the M first SS blocks correspond to a first cell, and the processing module 11 is further used for determining the position of the time domain resource of the each first SS block, wherein a position of a time domain resource(s) of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

In the implementation of the present disclosure, optionally, the position of the time domain resource of the each first SS block and a position of a time domain resource of each second SS block in the N second SS blocks have no overlap.

In the implementation of the present disclosure, optionally, the transceiving module 12 is further used for: receiving reference information used for the network device to determine a position of a time domain resource of each second SS block.

The processing module 11 is specifically used for determining the position of the time domain resource of the each first SS block according to the reference information.

The network device 10 according to the implementation of the present disclosure may refer to the flow of the method 100 according to the implementation of the present disclosure, and various units/modules in the network device and other operations and/or functions described above are respectively for realizing the corresponding flow in the method 100, and will not be repeated here for brevity.

Or, the processing module 11 is used for generating time domain position indication information, wherein the time domain position indication information is used for indicating an offset of a position of a time domain resource of each synchronization signal (SS) block in M SS blocks relative to a predetermined position, and the M is a positive integer greater than or equal to 1.

The transceiving module 12 is used for sending the time domain position indication information to a terminal device.

The time domain position indication information sent to the terminal device by the network device according to the implementation of the present disclosure is used for indicating the offset of the position of the time domain resource of each SS block in the M SS blocks relative to the predetermined position, so that the terminal device can accurately determine the time domain resource of the synchronization signal block according to the time domain position indication information, and the network device can flexibly configure the time domain resource for transmitting the synchronization signal as the network device sends the time domain position indication information to the terminal device.

The network device 10 according to the implementation of the present disclosure may refer to the flow of the method 200 according to the implementation of the present disclosure, and various units/modules in the network device and other operations and/or functions described above are respectively for realizing the corresponding flow in the method 200, and will not be repeated here for brevity.

Figure 16:
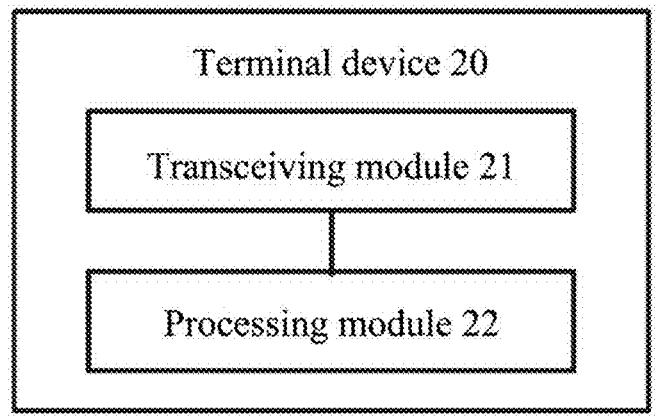
FIG. 16 is a schematic block diagram of a terminal device according to an implementation of the present disclosure.

FIG. 16 shows a terminal device according to an implementation of the present disclosure. As shown in FIG. 16, the terminal device 20 includes a transceiving module 21 and a processing module 22.

The transceiving module 21 is used for receiving time domain position indication information sent by a network device, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1.

The processing module 22 is used for determining a time domain resource of each first SS block according to the first time domain offset information.

The time domain position indication information received by the terminal device according to the implementation of the present disclosure includes first time domain offset information for indicating the offset of the position of the time domain resources of the synchronization signal SS block group relative to the predetermined position. Therefore, the terminal device can accurately determine the time domain resource of the synchronization signal block according to the first time domain offset information.

In the implementation of the present disclosure, optionally, the time domain position indication information further includes second time domain offset information for indicating an offset of a position of a time domain resource of each first SS block relative to the position of the time domain resources of the SS block group.

The processing module 22 is specifically used for determining the time domain resource of the each first SS block according to the first time domain offset information and the second time domain offset information.

In the implementation of the present disclosure, optionally, the time domain position indication information further includes time domain resource indication information and first quantity information, the time domain resource indication information is used for indicating a target time domain resource including the time domain resources of the SS block group, and the first quantity information is used for indicating a value of the M.

The processing module 22 is specifically used for determining the time domain resource of the each first SS block according to the first time domain offset information, the time domain resource indication information, and the first quantity information.

In the implementation of the present disclosure, optionally, the time domain position indication information further includes time interval information and second quantity information, the time interval information is used for the terminal device to determine a time interval between positions of time domain resources of two adjacent first SS blocks in the M first SS blocks, and the second quantity information is used for indicating a value of the M.

The processing module 22 is specifically used for determining the time domain resource of the each first SS block according to the first time domain offset information, the time interval information, and the second quantity information.

In the implementation of the present disclosure, optionally, the time interval information is used for indicating a minimum time interval between the positions of the time domain resources of two adjacent first SS blocks.

In the implementation of the present disclosure, optionally, the M is a positive integer greater than or equal to 2, and the time interval information is used for indicating a time interval between an end position of a time domain resource of an $i^{th}$ first SS block and a beginning position of a time domain resource of an $(i+1)^{th}$ first SS block, $i=1, \ldots, M-1$; or, the time interval information is used for indicating a time interval between a beginning position of the time domain resource of the $i^{th}$ first SS block and the beginning position of the time domain resource of the $(i+1)^{th}$ first SS block, $i=1, \ldots, M-1$.

In the implementation of the present disclosure, optionally, the M first SS blocks correspond to a first cell, and a position of a time domain resource(s) of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

In the implementation of the present disclosure, optionally, the position of the time domain resource of the each first SS block and a position of a time domain resource of each second SS block in the N second SS blocks have no overlap.

The terminal device 20 according to the implementation of the present disclosure may refer to the flow of the method 300 according to the implementation of the present disclosure, and various units/modules in the terminal device and other operations and/or functions described above are respectively for realizing the corresponding flow in the method 300, and will not be repeated here for brevity.

Or, the transceiving module 21 is used for receiving time domain position indication information sent by a network device, wherein the time domain position indication information is used for indicating an offset of a position of a time domain resource of each synchronization signal (SS) block in M SS blocks relative to a predetermined position, and the M is a positive integer greater than or equal to 1.

The processing module 22 is used for determining a time domain resource of each first SS block according to the time domain position indication information.

The time domain position indication information received by the terminal device according to the implementation of the present disclosure is used for indicating the offset of the position of the time domain resource of each SS block of the M SS blocks relative to the predetermined position. Therefore, the terminal device may accurately determine the time domain resource of the synchronization signal block according to the time domain position indication information.

The terminal device 20 according to the implementation of the present disclosure may refer to the flow of the method 400 according to the implementation of the present disclosure, and various units/modules in the terminal device and other operations and/or functions described above are respectively for realizing the corresponding flow in the method 400, and will not be repeated here for brevity.

Figure 17:
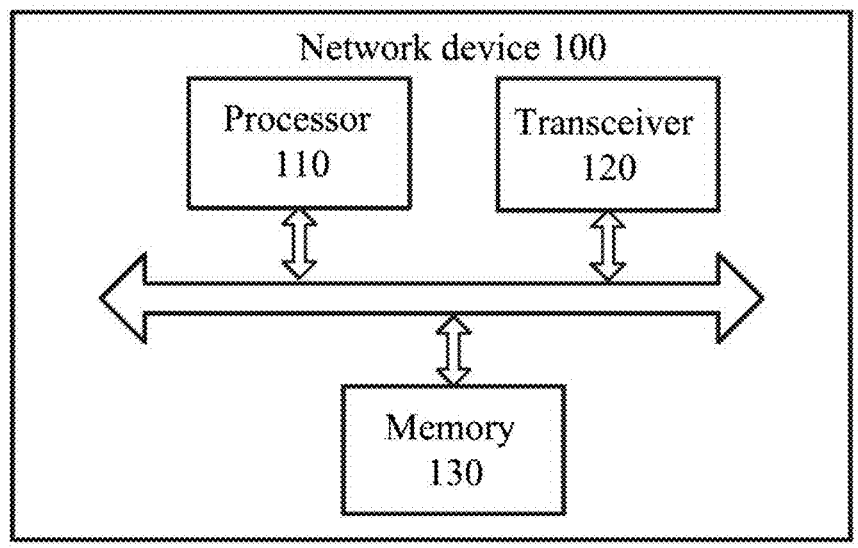
FIG. 17 is a schematic block diagram of a network device according to another implementation of the present disclosure.

FIG. 17 shows a network device according to another implementation of the present disclosure. As shown in FIG. 17, the network device 100 includes a processor 110 and a transceiver 120, and the processor 110 is connected to the transceiver 120. Optionally, the network device 100 further includes a memory 130, and the memory 130 is connected to the processor 110. Herein, the processor 110, the memory 130, and the transceiver 120 may communicate with each other through an internal connection path. The processor 110 is used for generating time domain position indication information, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1. The transceiver 120 is used for sending the time domain position indication information to a terminal device.

Therefore, the time domain position indication information sent to the terminal device by the network device according to the implementation of the present disclosure includes the first time domain offset information, so that the terminal device can accurately determine the time domain resource of the synchronization signal block according to the first time domain offset information, and the network device can flexibly configure the time domain resource for transmitting the synchronization signal as the network device sends the time domain position indication information to the terminal device.

Or, the processor 110 is used for generating time domain position indication information, wherein the time domain position indication information is used for indicating an offset of a position of a time domain resource of each synchronization signal (SS) block in M SS blocks relative to a predetermined position, and the M is a positive integer greater than or equal to 1. The transceiver 120 is used for sending the time domain position indication information to a terminal device.

Therefore, the time domain position indication information sent to the terminal device by the network device according to the implementation of the present disclosure is used for indicating the offset of the position of the time domain resource of each SS block in the M SS blocks relative to the predetermined position, so that the terminal device can accurately determine the time domain resource of the synchronization signal block according to the time domain position indication information, and the network device can flexibly configure the time domain resource for transmitting the synchronization signal as the network device sends the time domain position indication information to the terminal device.

The network device 100 according to the implementation of the present disclosure may refer to the network device 10 according to the implementation of the present disclosure, and various units/modules in the network device and other operations and/or functions described above are respectively for realizing the corresponding flow in the method 100 or 200, and will not be repeated here for brevity.

Figure 18:
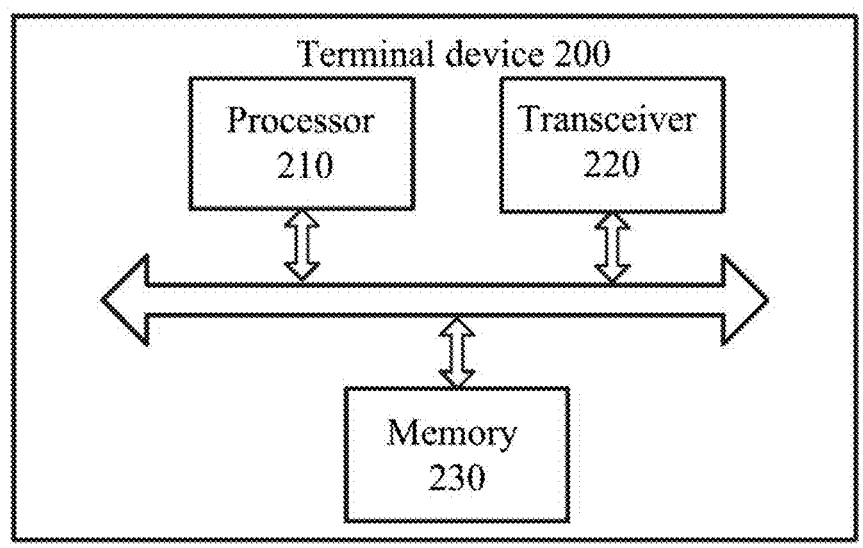
FIG. 18 is a schematic block diagram of a terminal device according to another implementation of the present disclosure.

FIG. 18 shows a schematic block diagram of a terminal device according to another implementation of the present disclosure. As shown in FIG. 18, the terminal device 200 includes a processor 210 and a transceiver 220. The processor 210 is connected to the transceiver 220. Optionally, the terminal device 200 further includes a memory 230 connected to the processor 210. Herein, the processor 210, the memory 230, and the transceiver 220 may communicate with each other through an internal connection path. Herein, the transceiver 220 is used for receiving time domain position indication information sent by a network device, wherein the time domain position indication information includes first time domain offset information for indicating an offset of a position of time domain resources of a synchronization signal (SS) block group relative to a predetermined position, the SS block group includes M first SS blocks, and the M is a positive integer greater than or equal to 1. The processor 210 is used for determining a time domain resource of each first SS block according to the first time domain offset information.

Therefore, the time domain position indication information received by the terminal device according to the implementation of the present disclosure includes the first time domain offset information for indicating the offset of the position of the time domain resources of the synchronization signal (SS) block group relative to the predetermined position. Thus, the terminal device can accurately determine the time domain resource of the synchronization signal block according to the first time domain offset information.

Or, the transceiver 220 is used for receiving time domain position indication information sent by a network device, wherein the time domain position indication information is used for indicating an offset of a position of a time domain resource of each synchronization signal (SS) block in M SS blocks relative to a predetermined position, and the M is a positive integer greater than or equal to 1. The processor 210 is used for determining a time domain resource of each SS block according to the time domain position indication information.

Therefore, the time domain position indication information received by the terminal device according to the implementation of the present disclosure is used for indicating the offset of the position of the time domain resource of each SS block in the M SS blocks relative to the predetermined position. Thus, the terminal device can accurately determine the time domain resource of the synchronization signal block according to the time domain position indication information.

The terminal device 200 according to the implementation of the present disclosure may refer to the terminal device 20 according to the implementation of the present disclosure, and various units/modules in the terminal device and other operations and/or functions described above are respectively for realizing the corresponding flow in the method 300 or 400, and will not be repeated here for brevity.

It should be understood that the processor in implementations of the present disclosure may be an integrated circuit chip with a capability for processing signals. The above processor may be a general purpose processor, a digital signal processor (DSP), an application specific integrated circuit (ASIC), a field programmable gate array (FPGA), or other programmable logic device, a discrete gate or transistor logic device, or a discrete hardware component. The processor may implement or execute various methods, acts and logic block diagrams disclosed in the implementations of the present disclosure. The general purpose processor may be a microprocessor, or the processor may be any conventional processor or the like.

The memory in implementations of the present disclosure may be a transitory memory or non-transitory memory, or may include both transitory and non-transitory memory. The non-transitory memory may be a read-only memory (ROM), a programmable ROM (PROM), an erasable programmable ROM (EPROM), an electrically erasable EPROM (EEPROM), or a flash memory. The transitory memory may be a random access memory (RAM) which serves as an external high speed cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memory of the systems and methods described herein is intended to include, but not limited to, these and any other suitable types of memories.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solutions. Skilled artisans may use different methods to implement the described functions in respect to each particular application, but such implementation should not be considered to be beyond the scope of the present disclosure.

Those skilled in the art may clearly understand that for convenience and conciseness of description, specific working processes of the systems, apparatuses and units described above may refer to the corresponding processes in the aforementioned method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes various medium capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

The invention claimed is:

1. A method for transmitting a synchronization signal, comprising:
generating, by a network device, time domain position indication information; and
sending, by the network device, the time domain position indication information to a terminal device,
wherein the time domain position indication information comprises first time domain offset information for indicating an offset of a position of time domain resources of a synchronization signal (SS) block group relative to a predetermined position, the SS block group comprises M first SS blocks, and the M is a positive integer greater than 1,
wherein the time domain position indication information further comprises time domain resource indication information and first quantity information, the time domain resource indication information is used for indicating a target time domain resource comprising the time domain resources of the SS block group, and the first quantity information is used for indicating a value of the M; and
wherein the first time domain offset information, the time domain resource indication information, and the first quantity information are used for the terminal device to determine a time domain resource of each first SS block.

2. The method according to claim 1, wherein the M first SS blocks correspond to a first cell, and the method further comprises:
determining, by the network device, a position of the time domain resource of each first SS block, wherein a position of a time domain resource of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

3. The method according to claim 2, wherein the position of the time domain resource of the each first SS block and a position of a time domain resource of each second SS block in the N second SS blocks have no overlap.

4. A method for transmitting a synchronization signal, comprising:
receiving, by a terminal device, time domain position indication information sent by a network device; and
determining, by the terminal device, a time domain resource of each first SS block according to the first time domain offset information, time domain resource indication information, and first quantity information,
wherein the time domain position indication information comprises first time domain offset information for indicating an offset of a position of time domain resources of a synchronization signal (SS) block group relative to a predetermined position, the SS block group comprises M first SS blocks, and the M is a positive integer greater than 1, and wherein the time domain position indication information further comprises the time domain resource indication information and the first quantity information, the time domain resource indication information is used for indicating a target time domain resource comprising the time domain resources of the SS block group, and the first quantity information is used for indicating a value of the M.

5. The method according to claim 4, wherein the M first SS blocks correspond to a first cell, and a position of a time domain resource of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

6. The method according to claim 5, wherein the position of the time domain resource of the each first SS block and a position of a time domain resource of each second SS block in the N second SS blocks have no overlap.

7. A network device, comprising a processor and a transceiver, wherein the processor is used for generating time domain position indication information, wherein the transceiver is used for sending the time domain position indication information to a terminal device, wherein the time domain position indication information comprises first time domain offset information for indicating an offset of a position of time domain resources of a synchronization signal (SS) block group relative to a predetermined position, the SS block group comprises M first SS blocks, and the M is a positive integer greater than 1, wherein the time domain position indication information further comprises time domain resource indication information and first quantity information, the time domain resource indication information is used for indicating a target time domain resource comprising the time domain resources of the SS block group, and the first quantity information is used for indicating a value of the M, and wherein the first time domain offset information, the time domain resource indication information, and the first quantity information are used for the terminal device to determine a time domain resource of each first SS block.

8. The network device according to claim 7, wherein the M first SS blocks correspond to a first cell, and the processor is further used for:

determining a position of the time domain resource of each first SS block, wherein a position of a time domain resource of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

9. The network device according to claim 8, wherein the position of the time domain resource of the each first SS block and a position of a time domain resource of each second SS block in the N second SS blocks have no overlap.

10. A terminal device, comprising a processor and a transceiver, wherein the transceiver is used for receiving time domain position indication information sent by a network device, wherein the processor is used for determining a time domain resource of each first SS block according to first time domain offset information, time domain resource indication information, and first quantity information, wherein the time domain position indication information comprises the first time domain offset information for indicating an offset of a position of time domain resources of a synchronization signal (SS) block group relative to a predetermined position, the SS block group comprises M first SS blocks, and the M is a positive integer greater than 1, and wherein the time domain position indication information further comprises the time domain resource indication information and the first quantity information, the time domain resource indication information is used for indicating a target time domain resource comprising the time domain resources of the SS block group, and the first quantity information is used for indicating a value of the M.

11. The terminal device according to claim 10, wherein the M first SS blocks correspond to a first cell, and a position of a time domain resource of at least one first SS block has no overlap or incomplete overlap with a position of a time domain resource of any second SS block in N second SS blocks, wherein the N second SS blocks correspond to a second cell, the second cell is a neighbor cell of the first cell, and the N is a positive integer greater than or equal to 1.

12. The terminal device according to claim 11, wherein the position of the time domain resource of the each first SS block and a position of a time domain resource of each second SS block in the N second SS blocks have no overlap.

* * * * *